(12) United States Patent
Asano et al.

(10) Patent No.: US 11,198,441 B2
(45) Date of Patent: Dec. 14, 2021

(54) VEHICLE CONTROL DEVICE

(71) Applicant: ADVICS CO., LTD., Kariya (JP)

(72) Inventors: Masayuki Asano, Susono (JP); Yukio Mori, Kariya (JP); Tatsuya Hiromura, Anjo (JP)

(73) Assignee: ADVICS CO., LTD., Kariya (JP)

( * ) Notice: Subject to any disclaimer, the term of this patent is extended or adjusted under 35 U.S.C. 154(b) by 204 days.

(21) Appl. No.: 16/484,535

(22) PCT Filed: Feb. 23, 2018

(86) PCT No.: PCT/JP2018/006598
§ 371 (c)(1),
(2) Date: Aug. 8, 2019

(87) PCT Pub. No.: WO2018/155602
PCT Pub. Date: Aug. 30, 2018

(65) Prior Publication Data
US 2020/0079389 A1 Mar. 12, 2020

(30) Foreign Application Priority Data
Feb. 24, 2017 (JP) .............................. JP2017-032997

(51) Int. Cl.
*B60W 40/107* (2012.01)
*B60W 30/16* (2020.01)
(Continued)

(52) U.S. Cl.
CPC .......... *B60W 40/107* (2013.01); *B60W 30/16* (2013.01); *B60W 30/18009* (2013.01); *B60W 40/076* (2013.01)

(58) Field of Classification Search
CPC .............. B60W 40/107; B60W 30/16; B60W 30/18009; B60W 40/076; B60W 10/04;
(Continued)

(56) References Cited

U.S. PATENT DOCUMENTS 6,401,024 B1 * 6/2002 Tange ................ B60K 31/0008
180/170
9,381,896 B2 * 7/2016 Takeuchi ............ B60T 8/17555
(Continued)

FOREIGN PATENT DOCUMENTS

JP 2008-120181 A 5/2008
WO WO-2016129318 A1 * 8/2016 .............. B60L 15/20

OTHER PUBLICATIONS

International Search Report dated Apr. 17, 2018 in PCT/JP2018/006598 filed on Feb. 23, 2018.

*Primary Examiner* — Adam R Mott
*Assistant Examiner* — Hana Lee
(74) *Attorney, Agent, or Firm* — Oblon, McClelland, Maier & Neustadt, L.L.P.

(57) ABSTRACT

This vehicle control device is provided with: a determination unit for determining whether proscribed conditions are satisfied, including the inability to determine that a longitudinal acceleration target value is fluctuating and the ability to determine that the longitudinal acceleration of a vehicle is fluctuating; and a cooperative control unit which, on the condition that it has been determined that the prescribed conditions are satisfied, performs a braking/driving cooperative process to hold a torque output from one of a driving torque generation device and a braking torque generation device at a value which is larger than the torque at the point in time at which the prescribed conditions were met, and adjusts the torque output from the other device through feedback control using the longitudinal acceleration target value and the longitudinal acceleration of the vehicle.

10 Claims, 6 Drawing Sheets

(51) Int. Cl.
*B60W 30/18* (2012.01)
*B60W 40/076* (2012.01)

(58) Field of Classification Search
CPC ......... B60W 10/08; B60W 10/18; G05B 5/00;
G05B 2219/41121
See application file for complete search history.

(56) References Cited

U.S. PATENT DOCUMENTS

2003/0184154 A1* 10/2003 Joyce ................. B60L 15/2009
303/152
2007/0005196 A1* 1/2007 Oikawa ................. G05D 19/02
701/1

* cited by examiner

VEHICLE CONTROL DEVICE

TECHNICAL FIELD

The present invention relates to a vehicle control device that controls longitudinal acceleration of the vehicle.

BACKGROUND ART

A vehicle having an automatic adjustment function of the longitudinal acceleration of the vehicle, such as adaptive cruise control and automatic operation control, is provided with a target calculation unit that calculates a longitudinal acceleration target value, which is a target value of the longitudinal acceleration. Patent Literature 1 describes an example of a method of calculating a longitudinal acceleration target value while a vehicle is traveling by adaptive cruise control. That is, according to Patent Literature 1, the target calculation unit calculates the longitudinal acceleration target value so that an inter-vehicle distance to the preceding vehicle traveling in front of the own vehicle can be held at the set inter-vehicle distance.

Furthermore, in the vehicle having the automatic adjustment function of the longitudinal acceleration, a driving torque output from a driving torque generation device and a braking torque output from a braking torque generation device are controlled based on a relationship between the longitudinal acceleration target value thus calculated and an actual longitudinal acceleration of the vehicle.

CITATIONS LIST

Patent Literature

Patent Literature 1: Japanese Laid-Open Patent Application Publication No. 2008-120181

SUMMARY OF INVENTION

Technical Problems

The driving torque generation device and the braking torque generation device may have a non-linear control region which is a control region where fine adjustment of torque is difficult. In a case where the torque is controlled in the non-linear control region, the torque becomes larger or smaller than necessary, and it becomes difficult to converge the actual longitudinal acceleration of the vehicle to the longitudinal acceleration target value. Therefore, in a case where the torque is adjusted in the non-linear control region, rapid increase and rapid decrease of the torque are alternately repeated, and the actual longitudinal acceleration of the vehicle may vibrate although the longitudinal acceleration target value is not vibrating.

Furthermore, a case where the driving torque is increased and a case where the braking torque is increased may alternately repeat depending on the longitudinal acceleration target value and the actual longitudinal acceleration of the vehicle. Even in such a case, the actual longitudinal acceleration of the vehicle may vibrate although the longitudinal acceleration target value is not vibrating.

If the actual longitudinal acceleration of the vehicle is vibrating, the passenger of the vehicle may feel uncomfortable riding the vehicle.

Solutions to Problems

A vehicle control device for solving the problem described above is a device to be applied to a vehicle, the vehicle including: a driving torque generation device that outputs a driving torque to wheels of the vehicle; and a braking torque generation device that outputs a braking torque to the wheels of the vehicle, and the vehicle control device is configured to control a longitudinal acceleration of the vehicle based on a longitudinal acceleration target value of the vehicle which is a target value of the longitudinal acceleration of the vehicle. The vehicle control device includes: a determination unit that determines whether or not prescribed conditions are satisfied, including an amplitude of a vibration of the longitudinal acceleration target value being smaller than or equal to a first determination amplitude and an amplitude of a vibration of the longitudinal acceleration of the vehicle being larger than a second determination amplitude; and a cooperative control unit that, on the condition that it has been determined that the prescribed conditions are satisfied, performs a braking/driving cooperative process to hold a torque output from one of the driving torque generation device and the braking torque generation device at a value larger than the torque at the point in time at which the prescribed conditions were met, and adjust the torque output from the other device through feedback control using the longitudinal acceleration target value and the longitudinal acceleration of the vehicle.

When the amplitude of the vibration of the longitudinal acceleration target value is smaller than or equal to the first determination amplitude, determination cannot be made that the longitudinal acceleration target value is vibrating. Furthermore, when the amplitude of the vibration of the longitudinal acceleration of the vehicle is larger than the second determination amplitude, determination can be made that the longitudinal acceleration of the vehicle is vibrating.

In the configuration described above, when the prescribed conditions are satisfied, the torque output from one of the driving torque generation device and the braking torque generation device is held at the value larger than the torque at the point in time at which the prescribed conditions were met, and the torque output from the other device is adjusted through the feedback control by the execution of the braking/driving cooperative process. Therefore, both the torque output from one device and the torque output from the other device can be made larger than those at the point in time at which the prescribed conditions were met. That is, both the torque output from one device and the torque output from the other device can be adjusted in a control region outside a non-linear control region, and as a result, the fine adjustment of the torque output from the other device becomes easier than before the prescribed conditions were met.

Furthermore, according to the execution of such braking/driving cooperative process, a period for adjusting the driving torque and a period for adjusting the braking torque can be suppressed from being alternately repeated.

Therefore, the generation of the vibration of the longitudinal acceleration of the vehicle when the longitudinal acceleration target value is not vibrating can be suppressed, and furthermore, the passenger of the vehicle can be suppressed from feeling degradation in the riding comfort.

DESCRIPTION OF EMBODIMENT

Hereinafter, one embodiment of a vehicle control device will be described with reference to FIGS. 1 to 6.

Figure 1:
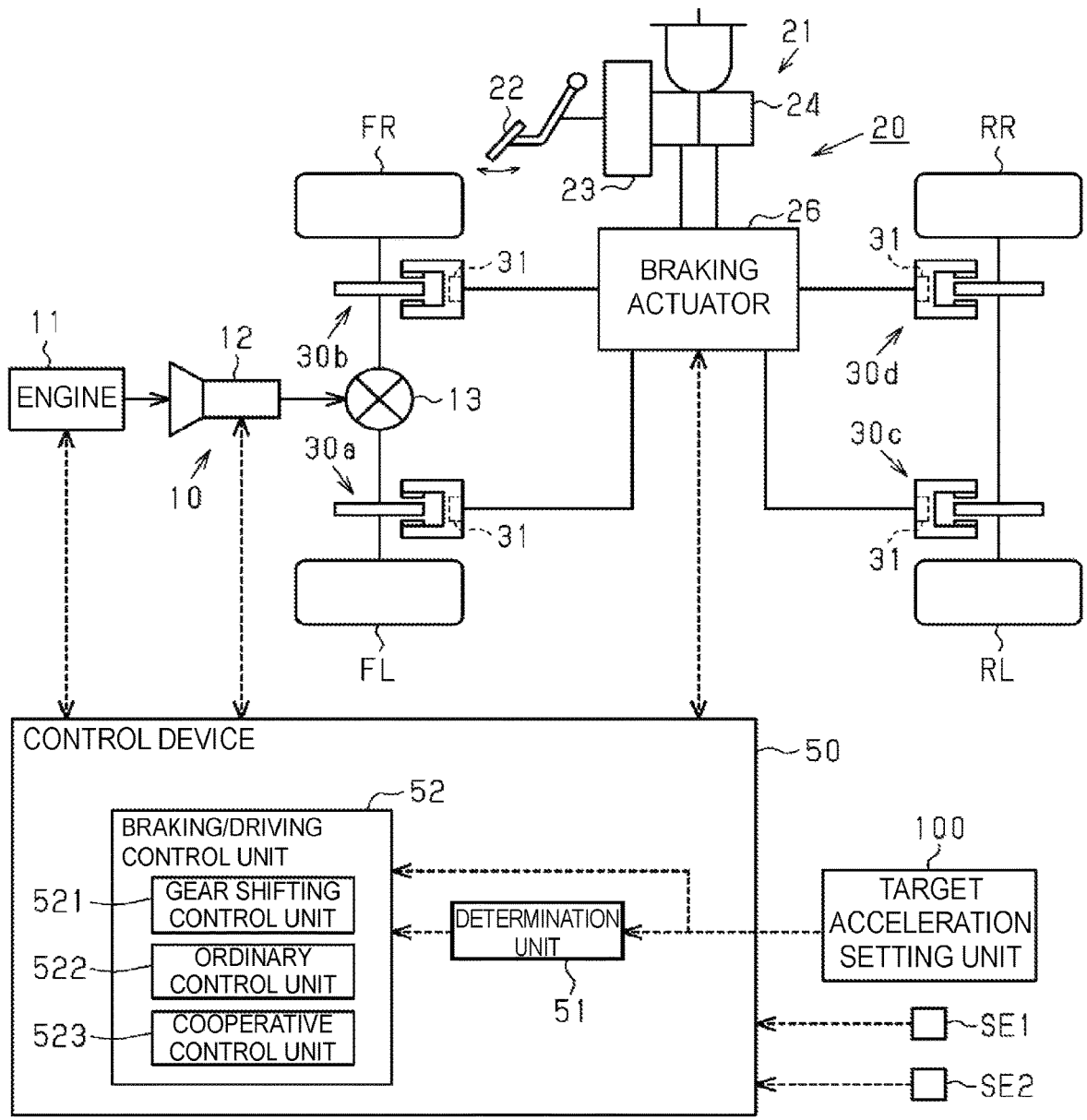
FIG. 1 is a diagram showing a functional configuration of a control device of a vehicle in accordance with an embodiment and a schematic configuration of a vehicle equipped with the control device.

FIG. 1 shows a vehicle equipped with a control device 50 in accordance with the present embodiment. As shown in FIG. 1, the vehicle is a front wheel drive vehicle having a plurality of (four in the present embodiment) wheels (left front wheel FL, right front wheel FR, left rear wheel RL, and right rear wheel RR). The vehicle includes a driving torque generation device 10 that outputs a driving torque to the front wheels FL and FR which are drive wheels, and a braking torque generation device 20 that outputs a braking torque to each of the wheels FL, FR, RL, and RR.

The driving torque generation device 10 includes an engine 11, which is an example of a power source of the vehicle, a transmission 12 configured to automatically change the shift stage, and a differential gear 13. The driving torque output from the engine 11 is transmitted to each of the front wheels FL and FR through the transmission 12 and the differential gear 13. In the present embodiment, as the transmission 12, a stepped type with six forward steps is employed. In this case, when the first shift stage is the lowest shift stage and the shift stage of the transmission 12 is the first shift stage, the transmission 12 cannot be further downshifted. That is, the first shift stage is the lowest shift stage.

The braking torque generation device 20 includes a hydraulic pressure generation device 21 to which a braking operation member 22 such as a brake pedal is connected, and a braking actuator 26. Wheel cylinders 31 of brake mechanisms 30a, 30b, 30c, and 30d provided on the wheels FL, FR, RL, and RR are connected to a hydraulic circuit of the braking actuator 26. The brake mechanisms 30a to 30d are configured to apply a larger braking torque to the wheels FL, FR, RL, and RR as the WC pressure, which is the hydraulic pressure in the wheel cylinder 31, becomes higher.

In the hydraulic pressure generation device 21, when the driver of the vehicle operates the braking operation member 22, an operation force input to the braking operation member 22 is input to a master cylinder 24 while being assisted by a booster 23, and an MC pressure, which is a hydraulic pressure corresponding to the input operation force, is generated in the master cylinder 24. Then, the brake fluid is supplied from the hydraulic pressure generation device 21 to the wheel cylinder 31 through the hydraulic circuit of the braking actuator 26. As a result, the WC pressure in the wheel cylinder 31 becomes higher as the operation force input to the braking operation member 22 becomes larger.

The braking actuator 26 is configured to adjust the braking torque for each of the wheel FL, FR, RL, and RR even in a case where the driver is not performing the braking operation, that is, to adjust the WC pressure in each wheel cylinder 31.

Next, the vehicle control device 50 will be described with reference to FIG. 1.

As shown in FIG. 1, two longitudinal acceleration sensors SE1 and SE2 that output detection signals corresponding to the longitudinal acceleration acting on the vehicle are electrically connected to the control device 50. The detection signal output from the first longitudinal acceleration sensor SE1 of the longitudinal acceleration sensors SE1 and SE2 is used when the vehicle control for automatically adjusting the longitudinal acceleration of the vehicle such as adaptive cruise control and automatic operation control is being performed. The detection signal output from the second longitudinal acceleration sensor SE2 is used when estimating the gradient of the road surface on which the vehicle travels.

Furthermore, the control device 50 is configured to communicate with a target acceleration setting unit 100 that sets a longitudinal acceleration target value GxTr which is a target value of the longitudinal acceleration when the vehicle control for automatically adjusting longitudinal acceleration of the vehicle is performed. Therefore, the control device 50 controls longitudinal acceleration Gx of the vehicle based on the longitudinal acceleration target value GxTr input from target acceleration setting unit 100.

The control device 50 includes a determination unit 51 and a braking/driving control unit 52 as functional units for controlling the driving torque generation device 10 and the braking torque generation device 20 based on the longitudinal acceleration target value GxTr.

The determination unit 51 determines whether or not a prescribed condition which is a condition for determining whether or not to execute shift process and braking/driving cooperative process to be described later is satisfied.

The braking/driving control unit 52 controls at least one of the driving torque generation device 10 and the braking torque generation device 20 in order to cause the longitudinal acceleration Gx to converge to the longitudinal acceleration target value GxTr. That is, the braking/driving control unit 52 includes a gear shifting control unit 521, an ordinary control unit 522, and a cooperative control unit 523.

The gear shifting control unit 521 performs a shift process for downshifting the transmission 12 under the condition that the prescribed condition is satisfied under a situation where the braking torque is not applied to the wheels FL, FR, RL, and RR. Furthermore, even when the prescribed condition is satisfied, the gear shifting control unit 521 does not perform the shift process if the transmission 12 cannot be further downshifted because the shift stage of the transmission 12 is the first shift stage.

The ordinary control unit 522 performs normal acceleration control process for controlling at least one of the driving torque and the braking torque under the condition that the prescribed condition is not satisfied. That is, in the acceleration control process for controlling the driving torque, the ordinary control unit 522 calculates a driving torque request value DTR, which is a request value of the driving torque, based on the longitudinal acceleration target value GxTr and the longitudinal acceleration Gx, and controls the driving torque generation device 10 so that the sum of the driving torques transmitted to the front wheels FL and FR converges to the driving torque request value DTR. Furthermore, in the acceleration control process for controlling the braking torque, the ordinary control unit 522 calculates a braking torque request value BTR, which is a request value of the braking torque, based on the longitudinal acceleration target value GxTr and the longitudinal acceleration Gx, and controls the operation of the braking actuator 26 so that the sum of the braking torques transmitted to each of the wheels FL, FR, RL, and RR converges to the braking torque request value BTR.

When the braking torque is applied to the wheels FL, FR, RL, and RR, the cooperative control unit 523 performs the braking/driving cooperative process for controlling both the driving torque and the braking torque under the condition that the prescribed condition is satisfied. Furthermore, the cooperative control unit 523 performs the braking/driving cooperative process under the condition that determination is made that the prescribed condition is satisfied when the transmission 12 cannot be further downshifted because the shift stage of the transmission 12 is the first shift stage. Then, in the braking/driving cooperative process, the cooperative control unit 523 calculates the driving torque request value DTR, and controls the driving torque generation device 10 based on the driving torque request value DTR. Furthermore, in the braking/driving cooperative process, the cooperative control unit 523 calculates the braking torque request value BTR, and controls the operation of the braking actuator 26 so that the sum of the braking torques transmitted to the wheels FL, FR, RL, and RR converges to the braking torque request value BTR.

Next, a processing routine executed by the determination unit 51 to determine whether or not the prescribed condition is satisfied will be described with reference to FIGS. 2 and 3. The present processing routine is executed for every control cycle set in advance.

Figure 2:
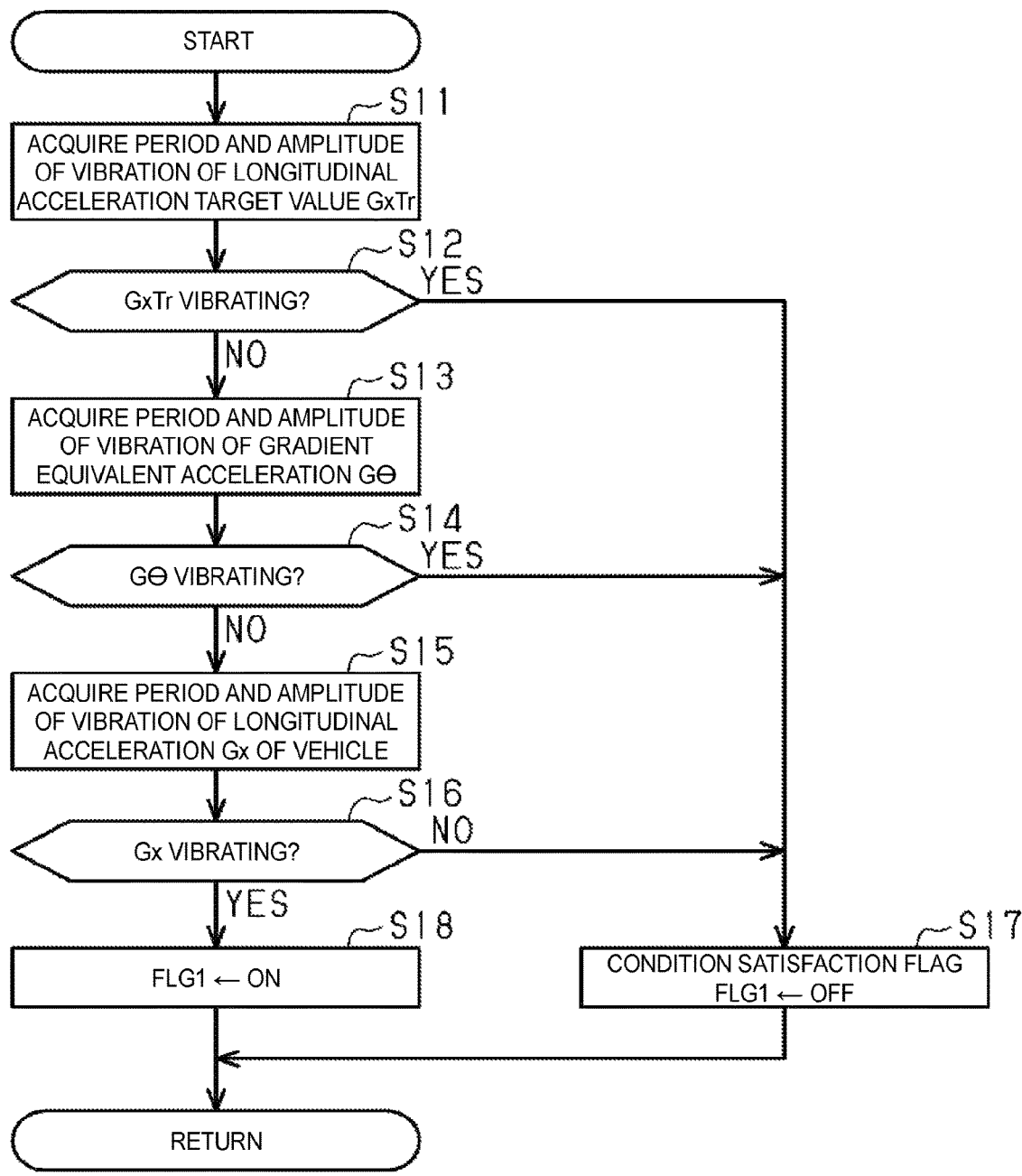
FIG. 2 is a flowchart describing a processing routine executed by a determination unit of the control device.
Figure 3:
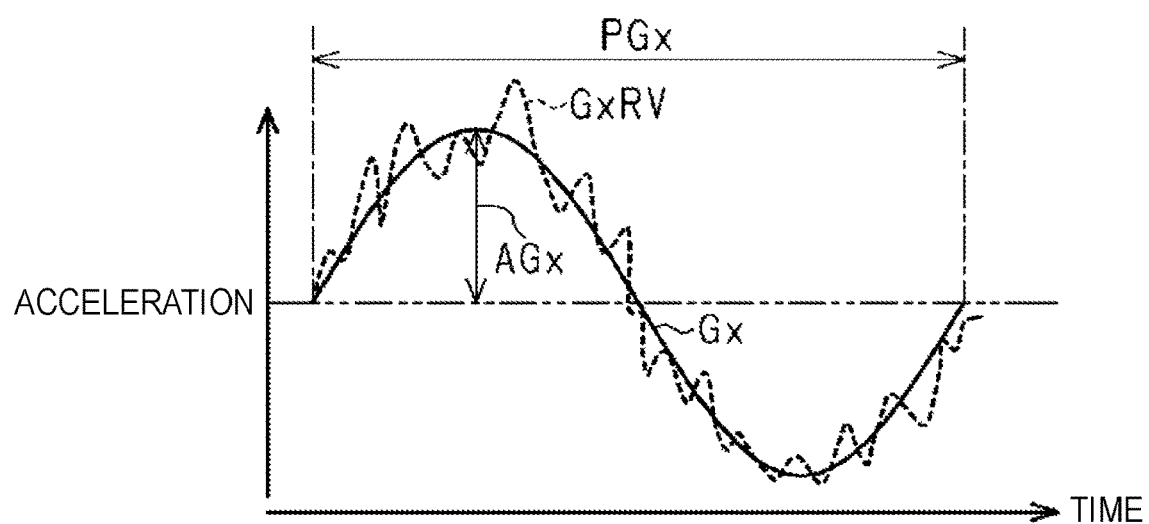
FIG. 3 is a graph showing a state in which noise components are removed to extract the vibration of the longitudinal acceleration of the vehicle.

As shown in FIG. 2, in the present processing routine, the determination unit 51 acquires a period Y1 and an amplitude Z1 of the vibration of the longitudinal acceleration target value GxTr of the vehicle (step S11). Subsequently, the determination unit 51 determines whether or not the longitudinal acceleration target value GxTr is vibrating (step S12). Specifically, the determination unit 51 can determine that the longitudinal acceleration target value GxTr is vibrating when both the acquired period Y1 of the vibration of the longitudinal acceleration target value GxTr being shorter than a first determination period Y1Th, and the amplitude Z1 of the vibration of the longitudinal acceleration target value GxTr being larger than a first determination amplitude Z1Th are satisfied. When determined that the longitudinal acceleration target value GxTr is vibrating (step S12: YES), the determination unit 51 proceeds the process to step S17 to be described later.

On the other hand, when it is determined that the longitudinal acceleration target value GxTr is not vibrating (step S12: NO), the determination unit 51 acquires a period Y3 and an amplitude Z3 of the vibration of a gradient equivalent acceleration G$\theta$ (step S13). The gradient equivalent acceleration G$\theta$ is an example of the gradient equivalent value that is a value correlated with the gradient of the road surface on which the vehicle travels, and can be calculated based on the detection signal from the second longitudinal acceleration sensor SE2. More specifically, the gradient equivalent acceleration G$\theta$ is a value obtained by performing well-known annealing process on the detection signal from the second longitudinal acceleration sensor SE2. Therefore, even if the longitudinal acceleration Gx of the vehicle is vibrating under a situation where the road surface gradient is constant, the gradient equivalent acceleration G$\theta$ hardly vibrates. Subsequently, the determination unit 51 determines whether or not the gradient equivalent acceleration G$\theta$ is vibrating (step S14). Specifically, the determination unit 51 determines that the road surface gradient is vibrating when both the acquired period Y3 of vibration of the gradient equivalent acceleration G$\theta$ being shorter than a third determination period Y3Th, and the amplitude Z3 of the vibration of the gradient equivalent acceleration G$\theta$ being larger than a third determination amplitude Z3Th are satisfied. Then, when determined that the gradient equivalent acceleration G$\theta$ is vibrating (step S14: YES), the determination unit 51 proceeds the process to step S17 to be described later.

On the other hand, when not determined that the gradient equivalent acceleration G$\theta$ is vibrating (step S14: NO), the determination unit 51 acquires a period Y2 and an amplitude Z2 of the vibration of the longitudinal acceleration Gx of the vehicle (step S15). The longitudinal acceleration Gx is a value corresponding to the actual longitudinal acceleration of the vehicle, and can be calculated based on the detection signal from the first longitudinal acceleration sensor SE1.

Here, an example of a method for acquiring the period Y2 and the amplitude Z2 of the vibration of the longitudinal acceleration Gx will be described with reference to FIG. 3. A raw value GxRV of the longitudinal acceleration based on a detection signal from the first longitudinal acceleration sensor SE1 includes a noise component as shown by a broken line in FIG. 3. Thus, the noise component is removed from the raw value GxRV of the longitudinal acceleration by filter process using a band pass filter or a low pass filter, and the longitudinal acceleration Gx indicated by a solid line in FIG. 3 is acquired. Then, from the waveform showing the transition of the longitudinal acceleration Gx thus acquired, the period PGx of the vibration of the longitudinal acceleration Gx is derived as the period Y2 by using the zero crossing method, and the amplitude AGx of the vibration is derived as the amplitude Z2.

The period Y1 and the amplitude Z1 of the vibration of the longitudinal acceleration target value GxTr can also be acquired by the same method as the method described with reference to FIG. 3. The period Y3 and the amplitude Z3 of the vibration of the gradient equivalent acceleration G$\theta$ can also be acquired by the same method as the method described with reference to FIG. 3.

Returning to FIG. 2, the determination unit 51 determines whether or not the longitudinal acceleration Gx is vibrating (step S16). Specifically, the determination unit 51 can determine that the longitudinal acceleration Gx is vibrating when both the acquired period Y2 of the vibration of the longitudinal acceleration Gx being shorter than a second determination period Y2Th, and the amplitude Z2 of the vibration of the longitudinal acceleration Gx being larger than a second determination amplitude Z2Th are satisfied. When it is determined that the longitudinal acceleration Gx is not vibrating (step S16: NO), the determination unit 51 proceeds the process to the next step S17.

In step S17, the determination unit 51 sets a condition satisfaction flag FLG1 to OFF. The condition satisfaction flag FLG1 is a flag which is set to be OFF when the prescribed condition is not satisfied, and is set to be ON when the prescribed condition is satisfied. Then, the determination unit 51 once ends the present processing routine.

On the other hand, when determined in step S16 that the longitudinal acceleration Gx is vibrating (YES), the determination unit 51 sets the condition satisfaction flag FLG1 to ON (step S18). That is, in the present embodiment, the prescribed condition includes all of the longitudinal acceleration target value GxTr not being determined as vibrating, the gradient equivalent acceleration G$\theta$ not being determined as vibrating, that is, the road surface gradient not being determined as periodically changing, and the longitudinal acceleration Gx being determined as vibrating. Thereafter, the determination unit 51 temporarily ends the present processing routine.

Next, with reference to FIG. 4, a processing routine executed by the braking/driving control unit 52 to perform a vehicle control based on the longitudinal acceleration target value GxTr will be described. The present processing routine is a routine that is repeatedly executed, and is executed at a timing when a prescribed time has elapsed from the end of the previous execution of the present processing routine. The prescribed time is a time corresponding to the control cycle.

Figure 4:
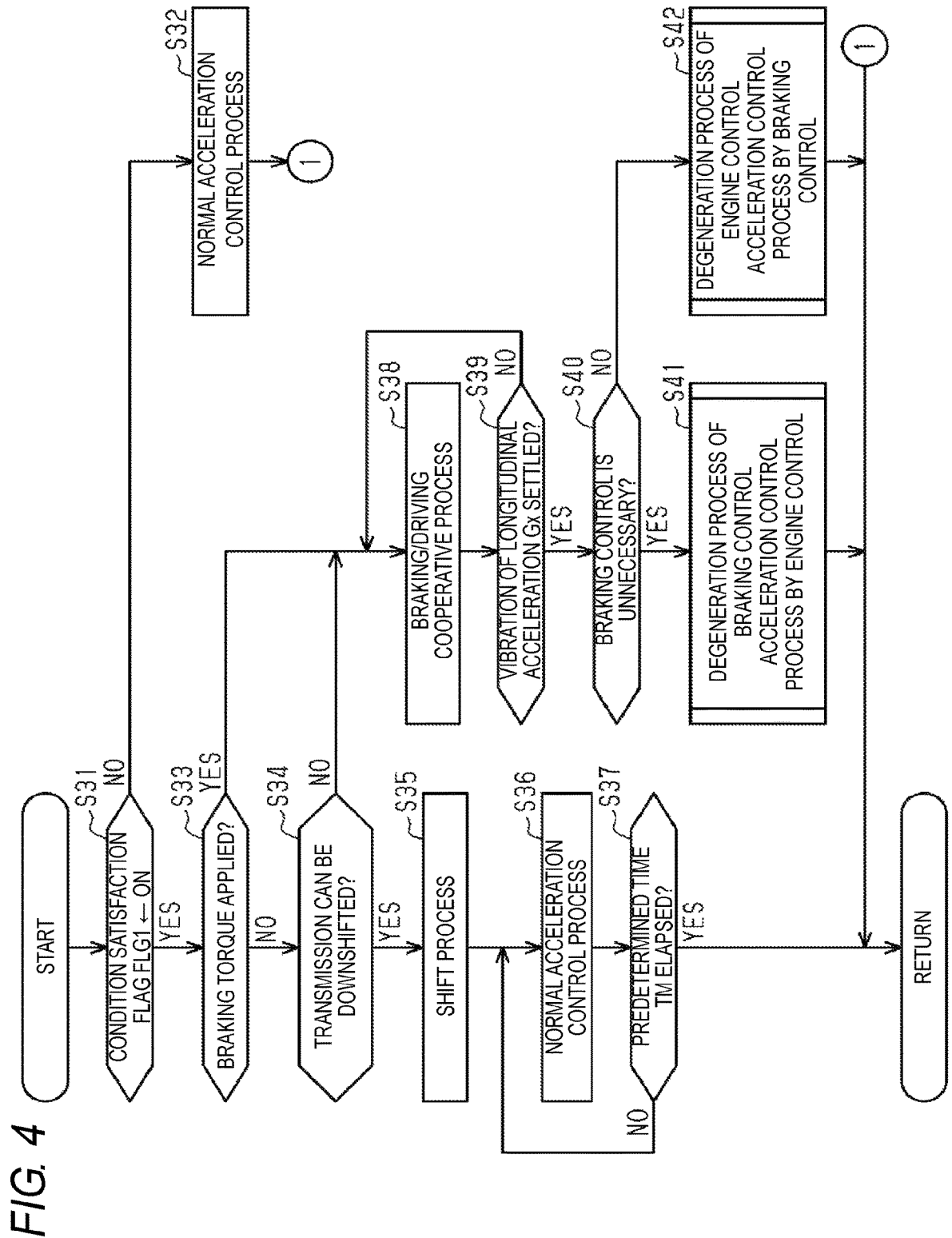
FIG. 4 is a flowchart describing a processing routine executed by a braking/driving control unit of the control device.

As shown in FIG. 4, in the present processing routine, the braking/driving control unit 52 determines whether or not the condition satisfaction flag FLG1 is set to ON (step S31). When the condition satisfaction flag FLG1 is set to OFF (step S31: NO), the prescribed condition is not satisfied, and hence the ordinary control unit 522 of the braking/driving control unit 52 performs the normal acceleration control process (step S32). That is, when the longitudinal acceleration Gx of the vehicle is less than or equal to the longitudinal acceleration target value GxTr, the ordinary control unit 522 controls the driving torque generation device 10, that is, the driving torque by the acceleration control process. On the other hand, when the longitudinal acceleration Gx of the vehicle is larger than the longitudinal acceleration target value GxTr, the ordinary control unit 522 controls the driving torque generation device 10, that is, the driving torque by acceleration control process to apply the engine brake to the vehicle, or control the braking torque generation device 20, that is, the braking torque. Then, the braking/driving control unit 52 temporarily ends the present processing routine.

On the other hand, when the condition satisfaction flag FLG1 is set to ON in step S31 (YES), the prescribed condition is satisfied, and hence the braking/driving control unit 52 determines whether or not the braking torque is applied to the wheels FL, FR, RL, and RR (step S33). When the braking torque is not applied to the wheels FL, FR, RL, and RR, the longitudinal acceleration Gx of the vehicle has a possibility of vibrating because the driving torque is adjusted in the non-linear control region of the driving torque. The non-linear control region is a control region where fine adjustment of the driving torque is difficult. On the other hand, when the braking torque is applied to the wheels FL, FR, RL, and RR, the longitudinal acceleration Gx of the vehicle has a possibility of vibrating because the braking torque is adjusted in the non-linear control region of the braking torque.

Therefore, when the braking torque is applied to the wheels FL, FR, RL, and RR (step S33: YES), the braking/driving control unit 52 proceeds the process to step S38 to be described later. On the other hand, when the braking torque is not applied to the wheels FL, FR, RL, and RR (step S33: NO), the braking/driving control unit 52 determines whether or not the transmission 12 can be downshifted (step S34). When the transmission 12 cannot be downshifted because the shift stage of the transmission 12 is the first shift stage (step S34: NO), the braking/driving control unit 52 proceeds the process to step S38 to be described later.

On the other hand, when the transmission 12 can be downshifted because the shift stage of the transmission 12 is not the first shift stage (step S34: YES), the gear shifting control unit 521 of the braking/driving control unit 52 downshifts the transmission 12, that is, lowers the shift stage of the transmission 12 by one by the shift process (step S35). Subsequently, the ordinary control unit 522 of the braking/driving control unit 52 performs the normal acceleration control process in the same manner as step S32 (step S36). Then, the braking/driving control unit 52 determines whether or not the elapsed time from the time when the shift process is performed has reached a predetermined time TM (step S37). A slight time lag occurs from when the shift process is performed until the downshift of the transmission is actually completed. Therefore, the predetermined time TM is set to a length corresponding to such a time lag.

When the elapsed time is less than the predetermined time TM (step S37: NO), the braking/driving control unit 52 proceeds the process to step S36 described above. On the other hand, when the elapsed time has reached the predetermined time TM (step S37: YES), the braking/driving control unit 52 temporarily ends the present processing routine.

In step S38, the cooperative control unit 523 of the braking/driving control unit 52 carries out the braking/driving cooperative process. That is, in the present embodiment, the braking/driving cooperative process is performed when the prescribed condition is satisfied under a situation where the braking torque is applied to the wheels FL, FR, RL, and RR. Furthermore, even if no braking torque is applied to the wheels FL, FR, RL, and RR, if the shift stage of the transmission 12 becomes the lowest state by the shift control, the braking/driving cooperative process is performed under the condition that a state in which the prescribed condition is satisfied is continued even if the shift process is performed.

In a vehicle equipped with the control device 50 of the present embodiment, the responsiveness of the braking torque resulting from the operation of the braking actuator 26 is higher than the responsiveness of the driving torque resulting from the driving of the engine 11. Therefore, in the braking/driving cooperative process, the cooperative control unit 523 holds the driving torque output from the engine 11, that is, the driving torque request value DTR at a value larger than the driving torque at the time point the prescribed condition is satisfied. Specifically, assuming that the driving torque at the time point the prescribed condition is satisfied is a reference driving torque DTB, in the braking/driving cooperative process, the driving torque request value DTR is made equal to the sum of the reference driving torque DTB and an offset value X. The offset value X is a value corresponding to the difference between the upper limit and the lower limit of the non-linear control region of the driving torque.

Furthermore, in the braking/driving cooperative process, the cooperative control unit 523 derives the operation amount of the braking actuator 26, that is, the braking torque request value BTR, by feedback control using the longitudinal acceleration target value GxTr and the longitudinal acceleration Gx of the vehicle.

Then, in the braking/driving cooperative process, the cooperative control unit 523 controls the engine 11 based on the driving torque request value DTR calculated in this manner, and controls the operation of the braking actuator 26 based on the braking torque request value BTR calculated in this manner.

Subsequently, the braking/driving control unit 52 determines whether or not the vibration of the longitudinal acceleration Gx of the vehicle is settled (step S39). Specifically, determination can be made that the vibration of the longitudinal acceleration Gx is settled when the amplitude Z2 of the vibration of the longitudinal acceleration Gx becomes smaller than the second determination amplitude Z2Th. When still not determined that the vibration of the longitudinal acceleration Gx is settled (step S39: NO), the braking/driving control unit 52 proceeds the process to step S38 described above. That is, the execution of the braking/driving cooperative process is continued.

On the other hand, when determined that the vibration of the longitudinal acceleration Gx is settled (step S39: YES), the braking/driving control unit 52 determines whether or not the execution of the braking control to apply the braking torque to the wheels FL, FR, RL, and RR is unnecessary (step S40). It can be determined that the execution of the braking control is unnecessary when the longitudinal acceleration Gx is smaller than or equal to the longitudinal acceleration target value GxTr, and it can be determined that the execution of the braking control is necessary when the longitudinal acceleration Gx is larger than the longitudinal acceleration target value GxTr, Therefore, when determined that the execution of the braking control is unnecessary (step S40: YES), the cooperative control unit 523 of the braking/driving control unit 52 performs the degeneration process of the braking control, and performs the acceleration control process by the engine control (step S41). That is, in the degeneration process of the braking control, the cooperative control unit 523 gradually reduces the braking torque request value BTR toward "0". Furthermore, in the acceleration control process by the engine control, the cooperative control unit 523 calculates the driving torque request value DTR to converge the longitudinal acceleration Gx toward the longitudinal acceleration target value GxTr, and controls the engine 11 based on the driving torque request value DTR. Then, the cooperative control unit 523 ends the process of step S41 when the braking torque becomes equal to "0" by the degeneration process. Thereafter, the braking/driving control unit 52 temporarily ends the present processing routine.

On the other hand, when determined in step S40 that the execution of the braking control is necessary (step S40: NO), the cooperative control unit 523 of the braking/driving control unit 52 performs the degeneration process of engine control and performs the acceleration control process by the braking control (step S42). That is, in the degeneration process of the engine control, the cooperative control unit 523 gradually reduces the driving torque request value DTR toward the driving torque at the time when the engine 11 is idling. Furthermore, in the acceleration control process by the braking control, the cooperative control unit 523 calculates the braking torque request value BTR to converge the longitudinal acceleration Gx to the longitudinal acceleration target value GxTr, and controls the braking actuator 26 based on the braking torque request value BTR. Then, when the driving torque becomes equal to the driving torque at the time of idling by the degeneration process, the cooperative control unit 523 ends the process of step S42. Thereafter, the braking/driving control unit 52 temporarily ends the present processing routine.

Next, with reference to FIG. 5, the operation in a case where the vibration of the longitudinal acceleration Gx of the vehicle is converged by performing the shift process under a situation where the prescribed condition is satisfied will be described together with the effect. A chain double dashed line in FIG. 5(*a*) indicates the acceleration corresponding to the lower limit of the driving torque output from the engine 11. A solid line in FIG. 5(*b*) indicates the transition of the driving torque request value DTR, and a hatched region is the non-linear control region of the driving torque. Furthermore, a solid line in FIG. 5(*c*) indicates the transition of the braking torque request value BTR, and a hatched region is the non-linear control region of the braking torque.

Figure 5:
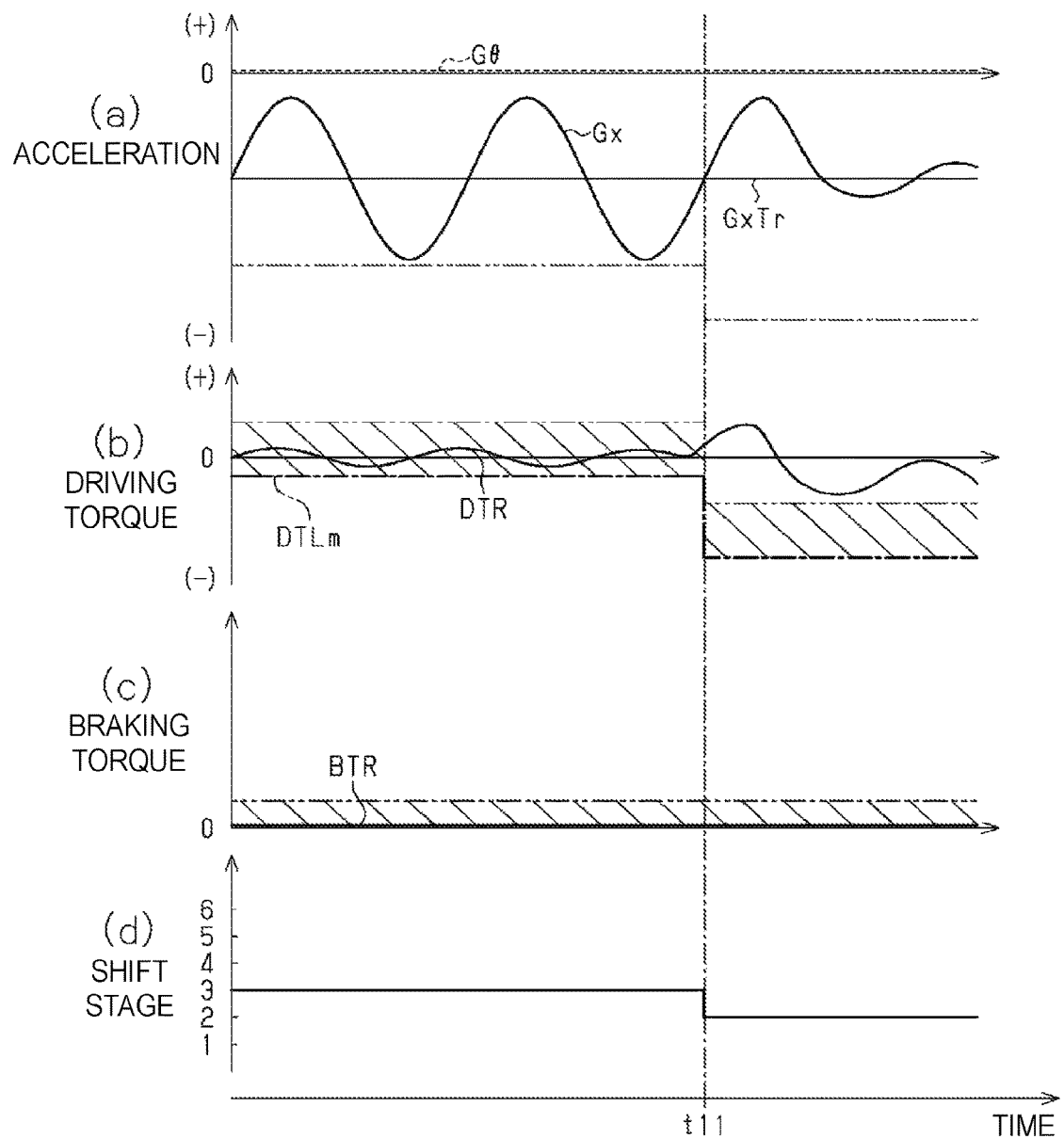
FIGS. 5(a) to 5(d) are timing charts showing a case where a shift process is performed under the condition that a prescribed condition is satisfied.

As shown in FIGS. 5(*a*), 5(*b*), 5(*c*), and 5(*d*), since the driving torque is adjusted in the non-linear control region, the controllability of the driving torque is low. As a result, the rapid increase and rapid decrease of the driving torque are alternately repeated, so that the longitudinal acceleration Gx of the vehicle cannot be converged to the longitudinal acceleration target value GxTr, and the longitudinal acceleration Gx vibrates. At this time, since it is not determined that the longitudinal acceleration target value GxTr is vibrating nor that the gradient equivalent acceleration Gθ is vibrating, determination is made that the prescribed condition is satisfied at the first timing t11. When the driving torque request value DTR is a negative value, the driving torque transmitted to the wheels FL, FR, RL, and RR becomes negative, so that the engine brake is applied to the vehicle.

In the example shown in FIG. 5, the shift process is performed at the first timing t11 as the braking torque is not applied to the wheels FL, FR, RL, and RR, and the shift stage of the transmission 12 is the third shift stage. As a result, the shift stage of the transmission 12 is changed from the third shift stage to the second shift stage. Thus, as shown with a chain double dashed line in FIG. 5(*a*), the acceleration corresponding to the lower limit of the driving torque output from the engine 11 becomes smaller, and thus the lower limit DTLm of the driving torque that can be transmitted to the front wheels FL and FR which are the drive wheels through the transmission 12 can be lowered as shown by a chain dashed line in FIG. 5(*b*). The non-linear control region of the driving torque can be lowered to the lower side in the figure. Therefore, the driving torque request value DTR becomes larger than the upper limit of the non-linear control region. That is, the driving torque can be controlled in a control region outside the non-linear control region. As a result, fine adjustment of the driving torque becomes easy compared to that before the execution of the shift process, and the longitudinal acceleration Gx can be converged to the longitudinal acceleration target value GxTr, and furthermore, the vibration of the longitudinal acceleration Gx can be suppressed. Therefore, the passenger of the vehicle is less likely to feel uncomfortableness in riding the vehicle.

Moreover, in the present embodiment, a state in which the longitudinal acceleration Gx is vibrating can be resolved without performing the braking/driving cooperative process by performing the shift process. That is, the vibration of the longitudinal acceleration Gx can be suppressed while suppressing an increase in the energy loss of the vehicle.

The vibration of the longitudinal acceleration Gx may not be suppressed only by performing the shift process once. In this case, the shift process is performed again to lower the shift stage of the transmission 12 by one more. As described above, when the vibration of the longitudinal acceleration Gx can be suppressed while the shift process is repeatedly performed until the shift stage of the transmission 12 becomes the first shift stage, the braking/driving cooperative process may not be performed.

When the braking torque is applied to the wheels FL, FR, RL, and RR even when the prescribed condition is satisfied under a situation where the shift stage of the transmission 12 is not the first shift stage, the braking/driving cooperative process is performed without performing the shift process. This is because there is a possibility that the longitudinal acceleration Gx is vibrating due to the braking torque being applied to the wheels FL, FR, RL, and RR. In such a case, the vibration of the longitudinal acceleration Gx cannot be suppressed even if the transmission 12 is downshifted by performing the shift process.

Therefore, in a case where the prescribed condition is satisfied under a situation where the braking torque is applied to the wheels FL, FR, RL, and RR, the braking/driving cooperative process is performed although the transmission 12 can be downshifted. Then, according to the execution of the braking/driving cooperative process, the driving torque request value DTR, which is a command value for the engine 11, which is a device having low responsiveness, of the engine 11 and the braking actuator 26, is held at a value larger than the driving torque at the time point the prescribed condition is satisfied. As a result, the driving torque is adjusted in the control region outside the non-linear control region.

Furthermore, in the braking/driving cooperative process, the braking torque request value BTR, which is a command value for the braking actuator 26, is calculated by the feedback control described above. In the present embodiment, the driving torque is larger than that at the time point the prescribed condition is satisfied, and hence the braking torque is also larger than that at the time point the prescribed condition is satisfied. As a result, even if the braking torque is adjusted in the non-linear control region at the time point the prescribed condition is satisfied, the braking torque can be adjusted in the control region outside the non-linear control region by performing the braking/driving cooperative process. Therefore, the braking torque can be accurately controlled.

The occurrence of sudden changes in the driving torque and the braking torque can be suppressed by performing the braking/driving cooperative process in such a manner. As a result, the vibration of the longitudinal acceleration Gx of the vehicle is suppressed. Therefore, the occurrence of the vibration of the longitudinal acceleration Gx of the vehicle when the longitudinal acceleration target value GxTr and the gradient equivalent acceleration Gθ are not vibrating can be suppressed, and furthermore, the passenger of the vehicle can be suppressed from feeling degradation in the riding comfort.

Next, the operation when the prescribed condition is satisfied under a situation where the shift stage of the transmission 12 is set to the first shift stage will be described together with the effects with reference to FIG. 6. A chain double dashed line in FIG. 6(*a*) indicates the acceleration corresponding to the lower limit of the driving torque output from the engine 11. A solid line in FIG. 6(*b*) indicates the transition of the driving torque request value DTR, and a hatched region is the non-linear control region of the driving torque. Furthermore, a solid line in FIG. 6(*c*) indicates the transition of the braking torque request value BTR, and a hatched region is the non-linear control region of the braking torque.

Figure 6:
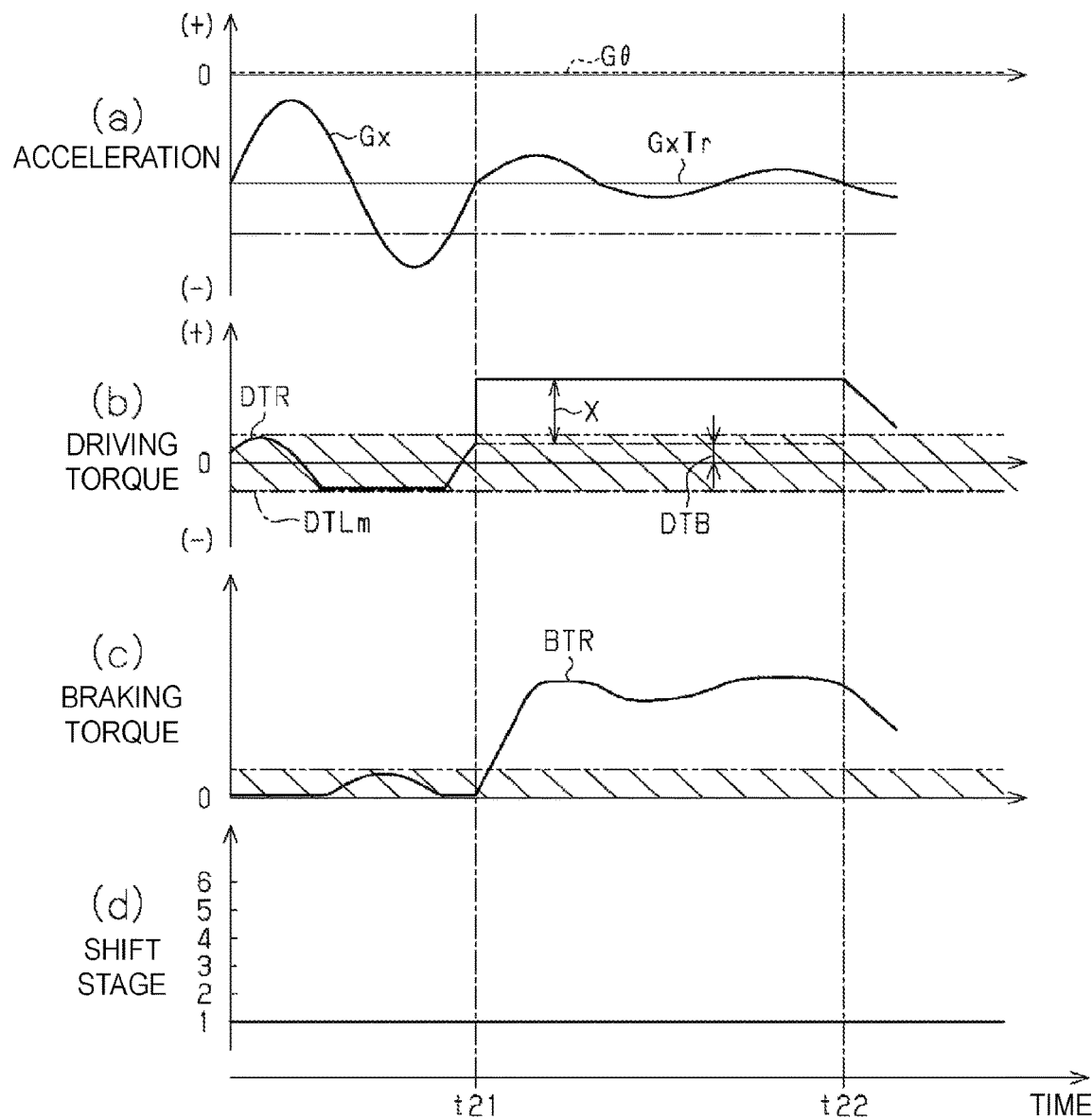
FIGS. 6(a) to 6(d) are timing charts showing a case where a braking/driving cooperative process is performed under the condition that a prescribed condition is satisfied.

As shown in FIGS. 6(*a*), 6(*b*), 6(*c*), and 6(*d*), since a case where the driving torque is adjusted and a case where the braking torque is adjusted are alternately repeated, determination may be made that the longitudinal acceleration Gx of the vehicle is vibrating although the longitudinal acceleration target value GxTr is not determined as vibrating and the gradient equivalent acceleration Gθ is not determined as vibrating. Then, determination is made that the prescribed condition is satisfied at the first timing t21.

In the example shown in FIG. 6, as the shift stage of the transmission 12 is the first shift stage, it is not possible to further downshift the transmission 12 by the execution of the shift process. Therefore, at the first timing t21, the execution of the braking/driving cooperative process is started. Accordingly, the driving torque request value DTR is held at a value larger than the driving torque at the time point the prescribed condition is satisfied. The driving torque request value DTR being a command value for the engine 11 and the braking actuator 26. As a result, the driving torque is adjusted in the control region outside the non-linear control region.

Furthermore, in the braking/driving cooperative process, the braking torque request value BTR, which is a command value for the braking actuator 26, is calculated by the feedback control described above. In the present embodiment, the driving torque is larger than that at the time point the prescribed condition is satisfied, and hence the braking torque is also larger than that at the time point the prescribed condition is satisfied. As a result, even if the braking torque is adjusted in the non-linear control region at the time point the prescribed condition is satisfied, the braking torque can be adjusted in the control region outside the non-linear control region by performing the braking/driving cooperative process. Therefore, the braking torque can be accurately controlled.

According to the execution of the braking/driving cooperative process in such a manner, a case where the braking torque is adjusted and a case where the driving torque is adjusted are not alternately repeated, and the occurrence of sudden changes in the driving torque and the braking torque can be suppressed. As a result, the vibration of the longitudinal acceleration Gx of the vehicle is suppressed. Therefore, the occurrence of the vibration of the longitudinal acceleration Gx of the vehicle when the longitudinal acceleration target value GxTr and the gradient equivalent acceleration GO are not vibrating can be suppressed, and furthermore, the passenger of the vehicle can be suppressed from feeling degradation in the riding comfort.

When the vibration of the longitudinal acceleration Gx is suppressed at the second timing t22, and determination is made that the longitudinal acceleration Gx converges to the longitudinal acceleration target value GxTr, the execution of the braking/driving cooperative process is ended. In the example shown in FIG. 6, the degeneration process of the braking control is performed, and the braking torque is gradually reduced. Then, the driving torque request value DTR is also gradually decreased. Therefore, even after the execution of the braking/driving cooperative process is ended, a state in which the longitudinal acceleration Gx is converged to the longitudinal acceleration target value GxTr is maintained.

The embodiment described above may be modified to another embodiment as described below.

In the embodiment described above, when a state in which the longitudinal acceleration Gx is vibrating cannot be resolved even if the shift process is performed once because the prescribed condition is satisfied under a situation where the braking torque is not applied to the wheels FL, FR, RL, and RR, the shift process is performed again if the transmission 12 can be further downshifted. However, the present invention is not limited thereto, and when the state in which the longitudinal acceleration Gx is vibrating cannot be resolved even if the shift process is performed once, the braking/driving cooperative process may be performed even if the transmission 12 can be further downshifted. According to this configuration, under the situation where the prescribed condition is satisfied, the state in which the prescribed condition is satisfied can be suppressed from continuing for a long time as compared with a case where the braking/driving cooperative process is not performed until the shift stage of the transmission 12 becomes the lowest state.

In the shift process, the shift stage of the transmission 12 may be lowered by two or more stages.

The vehicle including the control device 50 may have a configuration including a continuously variable transmission capable of changing the transmission ratio in stages as the transmission. The downshift in such a continuously variable transmission is to increase the transmission ratio. Even in this case, when the prescribed condition is satisfied under the situation where the braking torque is not applied to the wheels FL, FR, RL, and RR, the vibration of the longitudinal acceleration Gx can be suppressed by lowering the pseudo shift stage of the continuously variable transmission by the shift process.

As a driving torque generation device, a device including the drive motor as a power source can be mentioned. Hybrid vehicles and electric vehicles are known as vehicles equipped with such a driving torque generation device. In particular, in some electric vehicles, the transmission may not be disposed between the drive motor and the drive wheels. In such a vehicle, when determined that the prescribed condition is satisfied, the braking/driving cooperative process is performed regardless of whether or not the braking torque is applied to the wheels FL, FR, RL, and RR.

The braking torque generation device may not use the brake fluid as long as it can apply braking torque to the wheels FL, FR, RL, and RR by operating the brake mechanism provided for the wheels FL, FR, RL, and RR. For example, the braking torque generation device may be an electric braking device in which a braking motor is provided for each of the wheels FL, FR, RL, and RR.

In the embodiment described above, since the responsiveness of the braking torque generation device 20 is higher than the responsiveness of the engine 11, the braking torque request value BTR is calculated by the feedback control after fixing the driving torque request value DTR at a constant value in the braking/driving cooperative process. However, in a vehicle in which the responsiveness of the braking torque generation device 20 is lower than the responsiveness of the engine 11, the driving torque request value DTR may be calculated by the feedback control after fixing the braking torque request value BTR at a value larger than the braking torque at the time point the prescribed condition is satisfied in the braking/driving cooperative process.

In the braking/driving cooperative process, a torque request value with respect to one of the driving torque generation device 10 and the braking torque generation device 20 is held at a value equal to the sum obtained by adding an offset value X to the torque request value at the time point the prescribed condition is satisfied, and the torque request value output from the other device is calculated by the feedback control. However, the present invention is not limited thereto, and the torque request value may be calculated through another method as long as the torque request value with respect to one device can be made larger than the torque at the time point the prescribed condition is satisfied. For example, the torque request value with respect to one device may be held at a value equal to the product obtained by multiplying the torque request value at the time point the prescribed condition is satisfied by a predetermined gain value (value larger than 1 and for example, 1.3).

The vehicle may be provided with wheel speed sensors for detecting the wheel speeds of the wheels FL, FR, RL, and RR, and the vehicle body speed of the vehicle may be calculated based on at least one of the wheel speeds of the respective wheels FL, FR, RL, and RR calculated based on detection signals from the wheel speed sensors. When the control device 50 is applied to such a vehicle, a value obtained by time differentiating the wheel speed may be applied as the longitudinal acceleration Gx.

The control device 50 may be applied to a vehicle that cannot acquire a gradient of a road surface on which the vehicle travels or a value corresponding to the gradient. In this case, it is determined that the prescribed condition is satisfied when determined that both the longitudinal acceleration target value GxTr not being determined as vibrating and the longitudinal acceleration Gx being determined as vibrating are satisfied.

In the embodiment described above, when operating the braking torque generation device by the braking/driving cooperative process, the braking torque is applied to all the wheels FL, FR, RL, and RR. However, if the vehicle can be decelerated by the application of the braking torque, the braking torque may be applied to only some of the wheels FL, FR, RL, and RR (e.g., only the front wheels FL and FR).

The driving torque generation device 10 may be a device capable of applying a driving torque to the rear wheels RR and RL, or a device capable of applying a driving torque to all the wheels FL, FR, RL, and RR. Furthermore, the driving torque generation device may be a device having both the engine and the electric motor as a power source of the vehicle, or may be a device having only the electric motor as a power source of the vehicle. In addition, the vehicle may be an in-wheel system electric vehicle including a drive motor provided for each of the wheels FL, FR, RL, and RR as the driving torque generation device.

In the embodiment described above, the example in which the target acceleration setting unit 100 is provided in the vehicle has been described. However, if the control device 50 can receive the longitudinal acceleration target value GxTr, the target acceleration setting unit 100 may not be provided in the vehicle. For example, the target acceleration setting unit 100 may be provided on a portable terminal (such as a tablet terminal, a smartphone, etc.) owned by the passenger of the vehicle, or may be provided on a server outside the vehicle. In such a case, the vehicle is provided with a receiving unit for receiving data related to the longitudinal acceleration target value GxTr transmitted from the target acceleration setting unit 100, and the control device 50 receives the data received by the receiving unit, so that the control device 50 can acquire the longitudinal acceleration target value GxTr and control the longitudinal acceleration Gx based on the longitudinal acceleration target value GxTr.

The invention claimed is:

1. A vehicle control device to be applied to a vehicle, the vehicle including:
   a driving torque generation device that outputs a driving torque to wheels of the vehicle; and
   a braking torque generation device that outputs a braking torque to the wheels of the vehicle, the vehicle control device configured to control a longitudinal acceleration of the vehicle based on a longitudinal acceleration target value of the vehicle which is a target value of the longitudinal acceleration of the vehicle, the vehicle control device comprising:

processing circuitry configured to determine whether or not prescribed conditions are satisfied, including an amplitude of a vibration of the longitudinal acceleration target value being smaller than or equal to a first determination amplitude and an amplitude of a vibration of the longitudinal acceleration of the vehicle being larger than a second determination amplitude; and on the condition that it has been determined that the prescribed conditions are satisfied, perform a braking/driving cooperative process to hold a torque output from one of the driving torque generation device and the braking torque generation device at a value larger than the torque at a point in time at which the prescribed conditions were met, and adjust the torque output from the other device through feedback control using the longitudinal acceleration target value and the longitudinal acceleration of the vehicle.

2. The vehicle control device according to claim 1, wherein the processing circuitry determines that the prescribed conditions are satisfied when all of the amplitude of the vibration of the longitudinal acceleration target value being smaller than or equal to the first determination amplitude, the amplitude of the vibration of the longitudinal acceleration of the vehicle being larger than the second determination amplitude, and an amplitude of a gradient equivalent value which is a value correlated with a gradient of a road surface on which the vehicle travels being smaller than or equal to a third determination amplitude are satisfied.

3. The vehicle control device according to claim 2, wherein the driving torque generation device includes a transmission and is configured to transmit the driving torque output from a power source to the wheels through the transmission, the processing circuitry performs a shift process of downshifting the transmission under the condition that the prescribed conditions are satisfied, and the processing circuitry performs the braking/driving cooperative process under the condition that a state in which the prescribed conditions are satisfied is continued even if the shift process is performed.

4. The vehicle control device according to claim 3, wherein the processing circuitry performs the shift process under the condition that the prescribed conditions are satisfied in a state in which the transmission can be downshifted, and the processing circuitry performs the braking/driving cooperative process under the condition that a state in which the prescribed conditions are satisfied is continued even when a shift stage of the transmission is brought to a lowest state by the execution of the shift process.

5. The vehicle control device according to claim 4, wherein when the braking torque is not output from the braking torque generation device to the wheels, the processing circuitry performs the shift process under the condition that the processing circuitry determines that the prescribed conditions are satisfied, and when the braking torque is output from the braking torque generation device to the wheels, the processing circuitry performs the braking/driving cooperative process under the condition that the prescribed conditions are satisfied.

6. The vehicle control device according to claim 3, wherein when the braking torque is not output from the braking torque generation device to the wheels, the processing circuitry performs the shift process under the condition the prescribed conditions are satisfied, and when the braking torque is output from the braking torque generation device to the wheels, the processing circuitry performs the braking/driving cooperative process under the condition that that the prescribed conditions are satisfied.

7. The vehicle control device according to claim 1, wherein the driving torque generation device includes a transmission and is configured to transmit the driving torque output from a power source to the wheels through the transmission, processing circuitry performs a shift process of downshifting the transmission under the condition that the prescribed conditions are satisfied, and the processing circuitry performs the braking/driving cooperative process under the condition that a state in which the prescribed conditions are satisfied is continued even if the shift process is performed.

8. The vehicle control device according to claim 7, wherein the processing circuitry performs the shift process under the condition that the prescribed conditions are satisfied in a state in which the transmission can be downshifted, and the processing circuitry performs the braking/driving cooperative process under the condition that a state in which the prescribed conditions are satisfied is continued even when a shift stage of the transmission is brought to a lowest state by the execution of the shift process.

9. The vehicle control device according to claim 8, wherein when the braking torque is not output from the braking torque generation device to the wheels, the processing circuitry performs the shift process under the condition that the prescribed conditions are satisfied, and when the braking torque is output from the braking torque generation device to the wheels, the processing circuitry performs the braking/driving cooperative process under the condition that the prescribed conditions are satisfied.

10. The vehicle control device according to claim 7, wherein when the braking torque is not output from the braking torque generation device to the wheels, the processing circuitry performs the shift process under the condition that the prescribed conditions are satisfied, and when the braking torque is output from the braking torque generation device to the wheels, the processing circuitry performs the braking/driving cooperative process under the condition that the prescribed conditions are satisfied.

* * * * *